US012649395B2

(12) United States Patent
Hong et al.

(10) Patent No.: US 12,649,395 B2
(45) Date of Patent: Jun. 9, 2026

(54) APPARATUS FOR TILTING SEAT CUSHION OF REAR SEAT OF VEHICLE

(71) Applicants: Hyundai Motor Company, Seoul (KR); Kia Corporation, Seoul (KR)

(72) Inventors: Suk Won Hong, Bucheon (KR); Jong Seok Han, Suwon (KR); Sang Hyeok Yun, Ulsan (KR); Gil Ju Kim, Hwaseong (KR); Sang Man Seo, Hwaseong (KR); Bo Youn Seo, Hwaseong (KR); Ji Sung Bae, Geongnam (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 338 days.

(21) Appl. No.: 18/375,899

(22) Filed: Oct. 2, 2023

(65) Prior Publication Data

US 2024/0286537 A1 Aug. 29, 2024

(30) Foreign Application Priority Data

Feb. 23, 2023 (KR) ........................ 10-2023-0024278

(51) Int. Cl.
*B60N 2/427* (2006.01)
*B60N 2/02* (2006.01)
(52) U.S. Cl.
CPC ....... *B60N 2/4279* (2013.01); *B60N 2/02253* (2023.08)
(58) Field of Classification Search
CPC .............. B60N 2/4279; B60N 2/02253; B60N 2/42763; B60N 2/42754; B60N 2/10; B60N 2/164; B60N 2/1853; B60N 2/1814; B60N 2/1803
See application file for complete search history.

(56) References Cited

U.S. PATENT DOCUMENTS

| | | | | |
|---|---|---|---|---|
| 11,072,265 | B2 * | 7/2021 | Humer ................. | B60N 2/1864 |
| 2010/0066142 | A1 * | 3/2010 | Gross ................. | B60N 2/42763 |
| | | | | 297/284.1 |
| 2012/0112503 | A1 * | 5/2012 | Masutani ........... | B60N 2/42754 |
| | | | | 297/216.1 |
| 2022/0118891 | A1 * | 4/2022 | Kim ................... | B60N 2/02246 |
| 2022/0305965 | A1 * | 9/2022 | Lücke ................ | B60N 2/02246 |

(Continued)

FOREIGN PATENT DOCUMENTS

| | | | | |
|---|---|---|---|---|
| KR | 10-2018-0066646 A | 6/2018 | | |
| WO | WO-2022233761 A1 * | 11/2022 | ........... | B60N 2/1615 |

*Primary Examiner* — David R Dunn
*Assistant Examiner* — Jessica Kathryn Thompson
(74) *Attorney, Agent, or Firm* — Fox Rothschild LLP

(57) ABSTRACT

An apparatus for tilting a seat cushion of a rear seat of a vehicle includes: a fixing member connected to a vehicle body and being shaft-rotated while a location of the fixing member is fixed; a tilting motor coupled to the fixing member; and a linkage connecting the tilting motor and the seat cushion of the seat, and operable to move a front end of the seat cushion vertically when the tilting motor is moved. The front end of the seat may be moved vertically so as to implement a tilting function, and a tilting apparatus of the rear seat may be operated simultaneously with occurrence of a collision or immediately before a collision so as to adjust the front end of the seat cushion upward, so that movement of a passenger in an accident can be restricted.

17 Claims, 12 Drawing Sheets

(56) References Cited

U.S. PATENT DOCUMENTS

| | | | | |
|---|---|---|---|---|
| 2024/0075853 A1* | 3/2024 | Lee | .................... | B60N 2/02246 |
| 2024/0092237 A1* | 3/2024 | Kim | ........................ | B60N 2/10 |
| 2024/0149752 A1* | 5/2024 | Kim | ........................ | B60N 2/10 |

* cited by examiner

Figure 7:
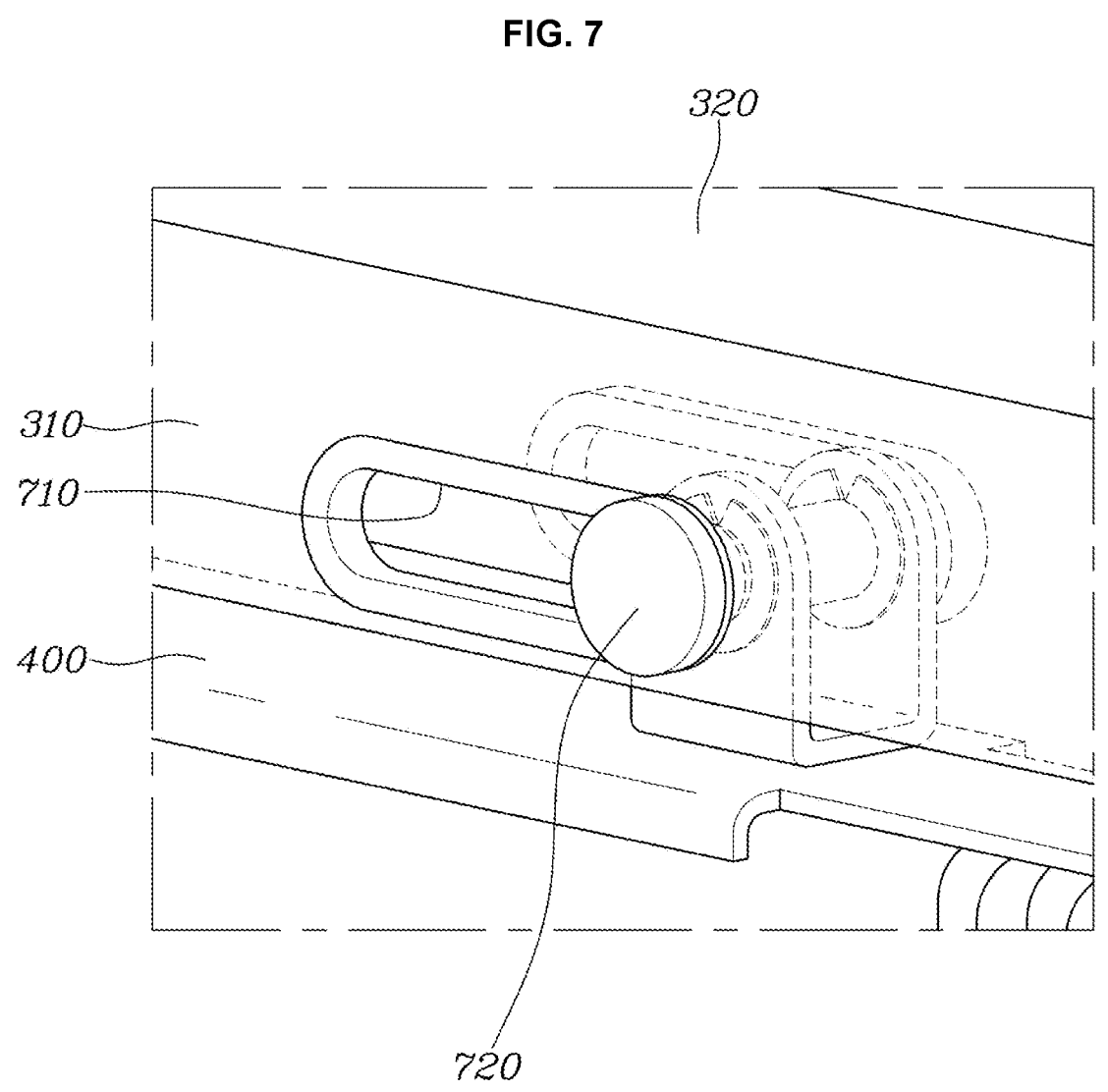

Figure 10:
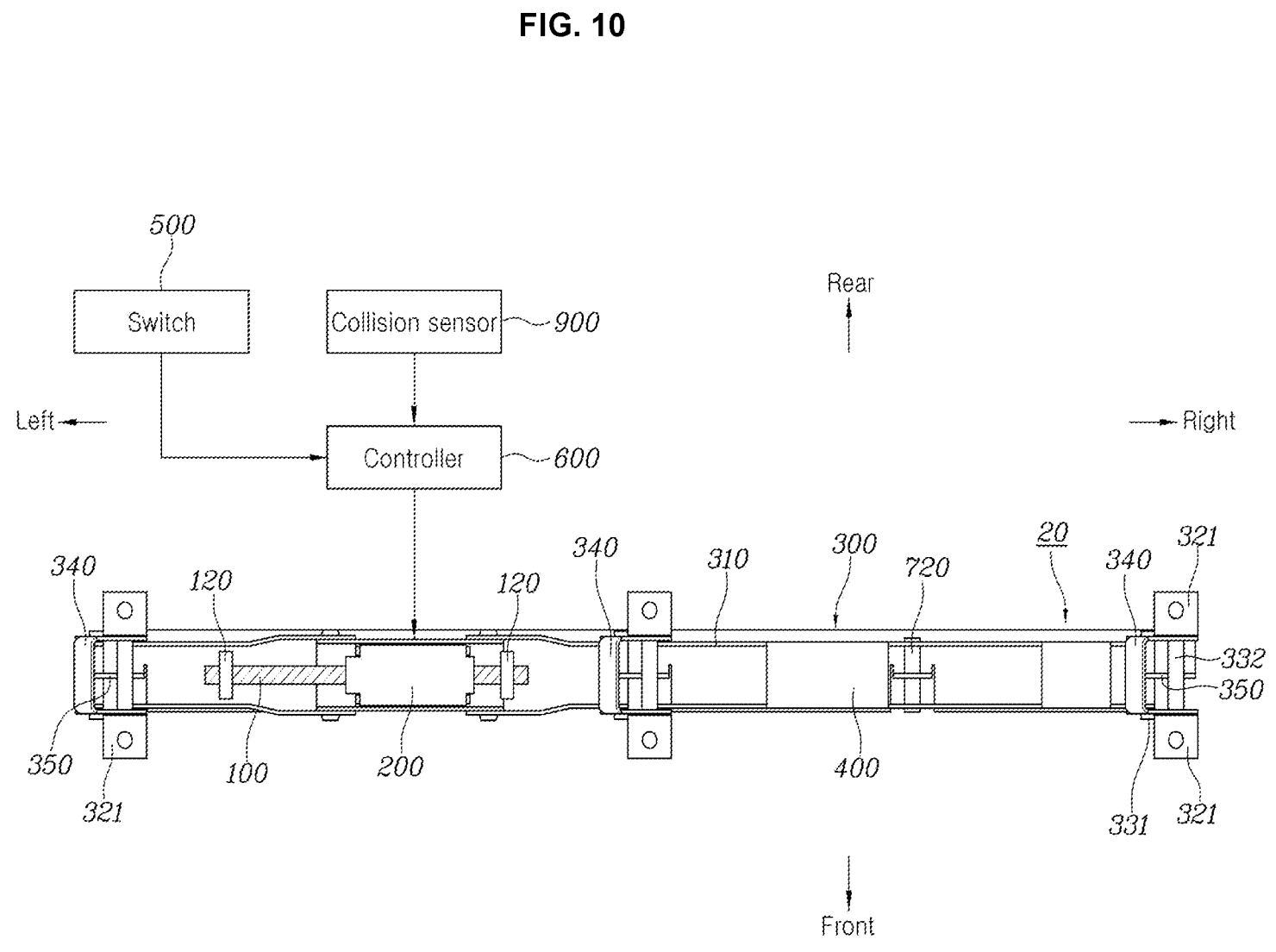

APPARATUS FOR TILTING SEAT CUSHION OF REAR SEAT OF VEHICLE

CROSS REFERENCE TO RELATED APPLICATION

The present application claims under 35 U.S.C. § 119(a) the benefit of Korean Patent Application No. 10-2023-0024278, filed Feb. 23, 2023, the entire contents of which are incorporated by reference herein.

BACKGROUND

1. Technical Field

The present disclosure relates to an apparatus for tilting a seat cushion of a rear seat of a vehicle, more particularly, to the apparatus for tilting the seat cushion of the rear seat so as to improve ride comfort of a passenger sitting on the rear seat by adjusting a vertical height of a front portion of the seat cushion.

2. Description of the Related Art

In general, a seat of a vehicle includes a seat back supporting the upper body of a passenger, a seat cushion supporting the lower body of the passenger, and a headrest supporting the head of the passenger.

In the case of certain vehicles (e.g., luxury vehicles), a rear seat includes a seat cushion sliding function in which the seat cushion is slidingly moved forward to adjust a location of the seat, a seat back reclining function in which the seat cushion is slidingly moved forward to lean the seat back rearward to adjust an angle of the seat back, a function adjusting an angle of the headrest forward and rearward, and a leg supporting function supporting leg of the passenger, and these functions contribute to improved ride comfort and convenience of the passenger.

However, there is no function for adjusting a vertical height of a seat cushion in a conventional rear seat.

For example, a passenger with a large body type can maintain a relaxed state of his or her leg or knee when the height of the front portion of the seat cushion is increased, but the conventional rear seat is not configured to adjust the vertical height of the seat cushion. Accordingly, it would be desirable to adjust the vertical height of the seat cushion to improve ride comfort and convenience of a passenger seated in a rear seat of a vehicle.

The description provided above as a related art of the present disclosure is just for helping understand the background of the present disclosure and should not be construed as being included in the related art known by those skilled in the art.

SUMMARY

The present disclosure relates to an apparatus for tilting a seat cushion of a seat (e.g., a rear seat) of a vehicle, the apparatus implementing a tilting function to the seat cushion, and is intended to promote improvement of ride comfort and convenience of a passenger of the rear seat and improve vehicle quality.

The present disclosure also is able to restrict movement of a passenger in an accident as much as possible by adjusting a front end of the seat cushion upward with operation of the tilting apparatus in the event of a collision, in order to minimize injury and strengthen safety.

In order to achieve the objectives of the present disclosure, there is provided an apparatus for tilting a seat cushion of a rear seat, the apparatus including: a fixing member connected to a vehicle body and configured to be shaft-rotated while a location of the fixing member may be fixed; a tilting motor coupled to the fixing member; and a linkage configured to connect the tilting motor and the seat cushion of the rear seat, and operable to move a front end of the seat cushion vertically when the tilting motor is moved.

The fixing member may be a lead screw, and the fixing member may extend transversely.

The tilting motor may be configured to move transversely in a longitudinal direction of the fixing member.

Opposite ends of the fixing member may be respectively coupled to fixing brackets with bearings as a medium; and the fixing brackets may be coupled to a base frame fixed to the vehicle body.

The tilting motor may be disposed to be stacked with the fixing member in the longitudinal direction of the fixing member and be coupled to the fixing member so as to allow power transmission.

The tilting motor may be configured to be operated by receiving a signal of a switch operated by a passenger.

The linkage may include: a transverse moving body coupled to the tilting motor to be moved leftward and rightward together with the tilting motor; a vertical moving body coupled to the front end of the seat cushion; a first rotation link rotatably coupled to the transverse moving body with a first hinge pin as a medium and rotatably coupled to a body bracket of the vertical moving body with a second hinge pin as a medium; and a second rotation link of which a first end may be rotatably coupled to the first rotation link with a third hinge pin as a medium between the first hinge pin and the second hinge pin and a second end may be rotatably hinged to the base frame.

The transverse moving body may be coupled to front and rear surfaces of the tilting motor and extend transversely.

The transverse moving body may have a guide slot formed by extending in a moving direction of the transverse moving body; and a guide pin fixed to the base frame may be inserted into the guide slot, and the guide slot and the guide pin may guide movement of the transverse moving body.

The vertical moving body may be disposed to extend transversely in the front end of the seat cushion, and when being operated, may move the (entire) front end of the seat cushion vertically.

Height adjustment of the front end of the seat cushion may be possible within various locations between minimum height and maximum height of the vertical moving body.

An assembly of the first rotation link and the second rotation link may be coupled to both of the transverse moving body and the vertical moving body, in at least two or more locations.

The apparatus may include: a hinge member having a rotation structure, the hinge member connecting a rear end of the seat cushion and the vehicle body to each other so as to absorb vertical movement of the front end of the seat cushion.

The apparatus may include: a controller configured to control an operation of the tilting motor, wherein the controller may be configured to use a signal of a collision sensor to control an operation of the tilting motor so as to adjust the front end of the seat cushion to the maximum height simultaneously with occurrence of a collision or immediately before occurrence of a collision.

According to the embodiment of the present disclosure, the apparatus for tilting the seat cushion of the rear seat is configured to implement the tilting function by moving vertically the front end of the seat cushion constituting the rear seat. Therefore, there is an effect that ride comfort and convenience of the passenger in the rear seat can be improved whereby improvement of marketability can be promoted.

Furthermore, the tilting apparatus is operated simultaneously with occurrence of a collision or immediately before occurrence of a collision so as to adjust the front end of the seat cushion upward as much as possible, so that movement of the passenger in an accident can be restricted as much as possible. Therefore, there is an effect that minimization of additional injuries and safety of the passenger can be promoted.

A vehicle may include: an apparatus for tilting a seat cushion of a seat, the apparatus including: a fixing member connected to a vehicle body and configured to be shaft-rotated while a location of the fixing member is fixed; a tilting motor coupled to the fixing member; and a linkage configured to connect the tilting motor and the seat cushion of the seat, and operable to move a front end of the seat cushion vertically when the tilting motor is moved.

The seat of the vehicle may be a rear seat.

BRIEF DESCRIPTION OF THE DRAWINGS

Figure 4:
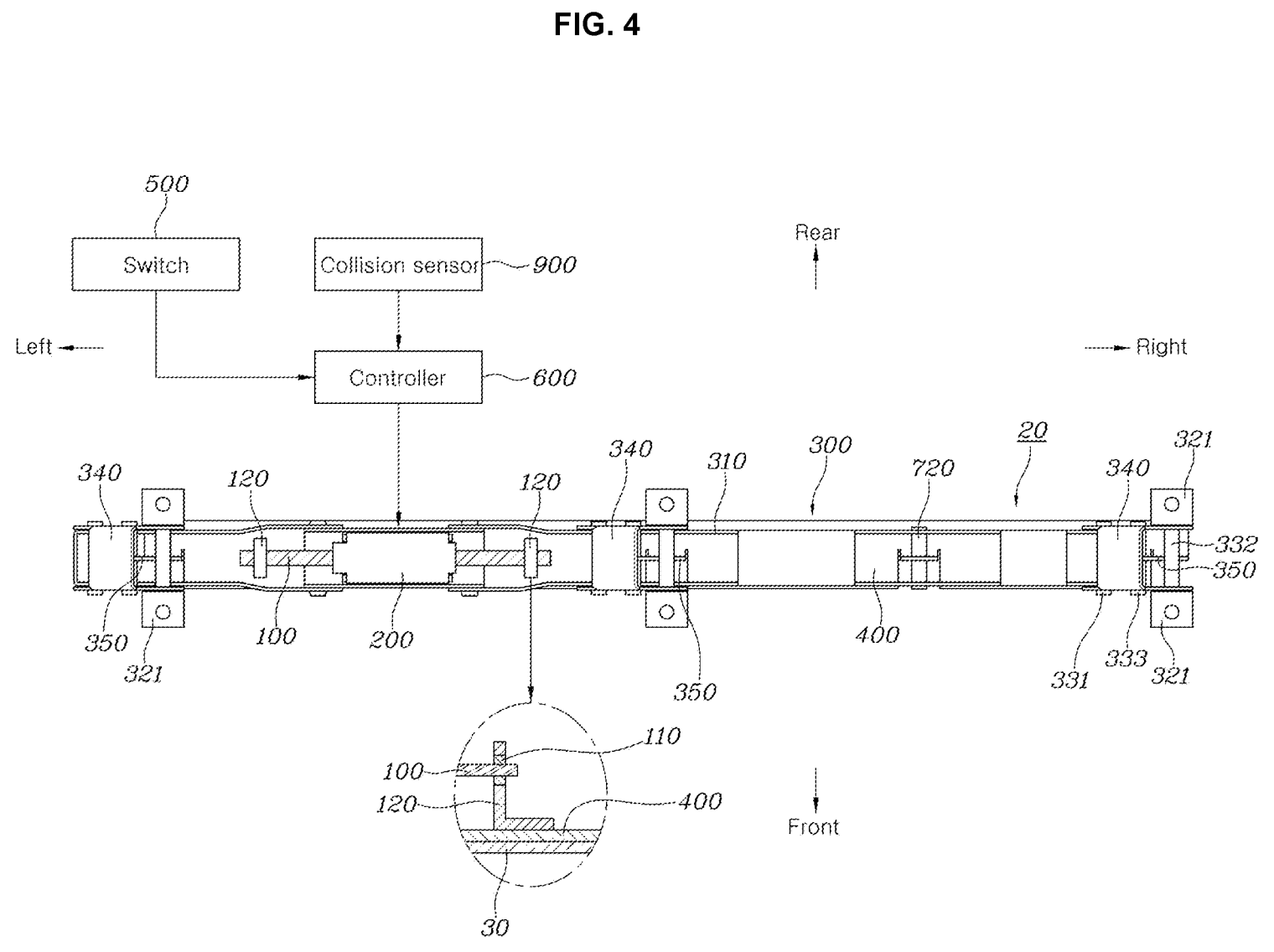

FIG. 4 is a plan view showing the tilting apparatus of FIG. 2 without a vertical moving body, FIG. 7 is a view showing a guide slot and a guide pin according to the present disclosure, FIG. 10 is a plan view showing the tilting apparatus of FIG. 9 without the vertical moving body.

DETAILED DESCRIPTION

Figure 1:
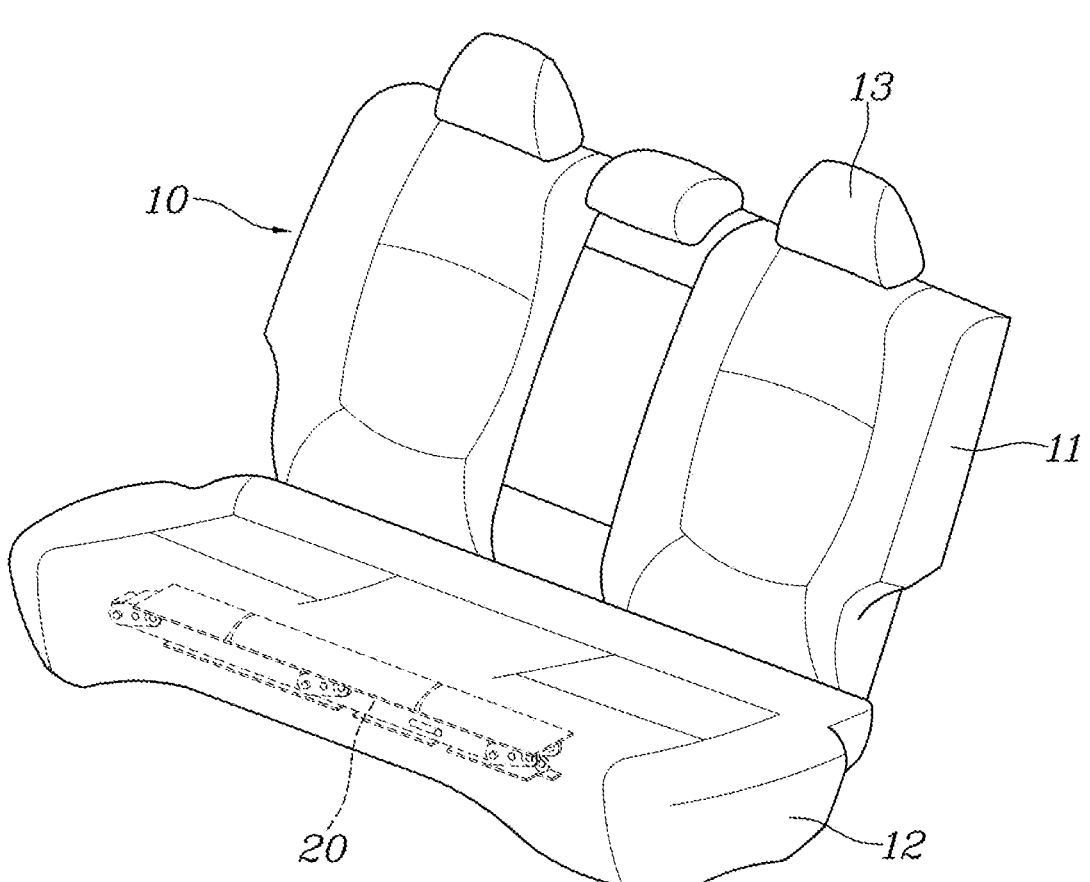
FIG. 1 is a view showing a rear seat including a tilting apparatus in a seat cushion according to the present disclosure, where a front end of the seat cushion is adjusted at a minimum height.
Figure 2:
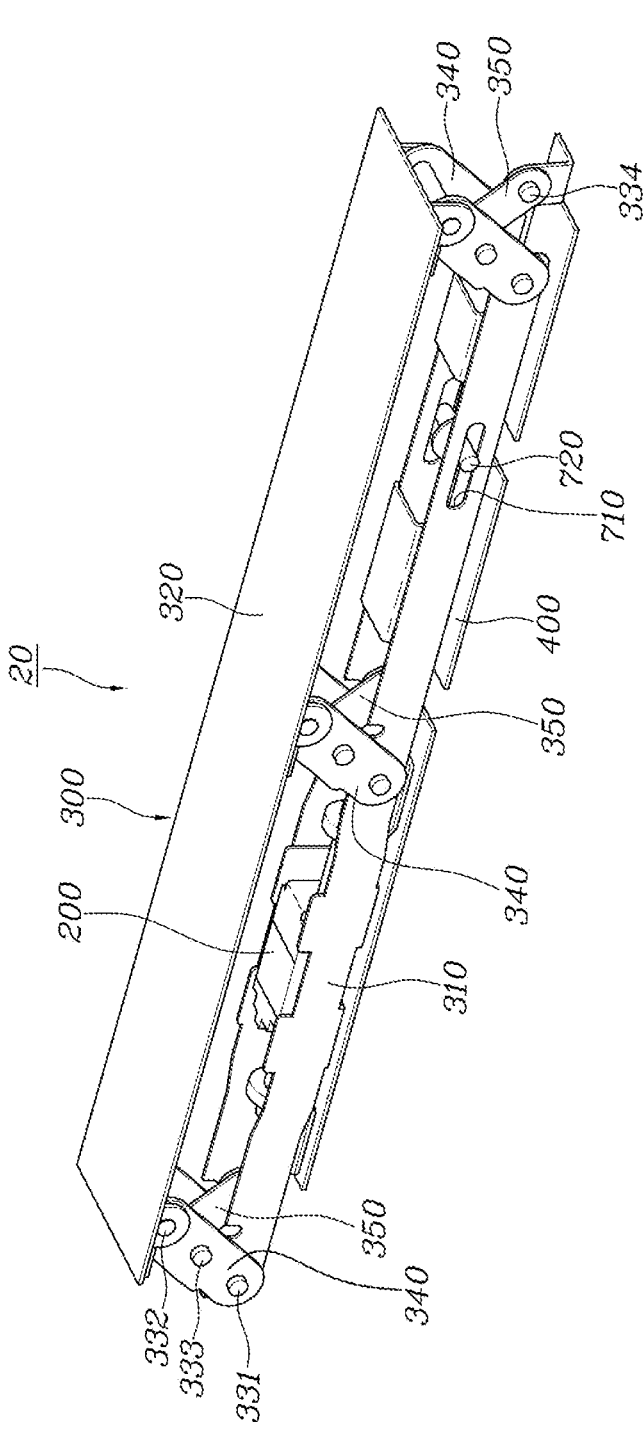
FIG. 2 is a view showing the tilting apparatus of FIG. 1.
Figure 3:
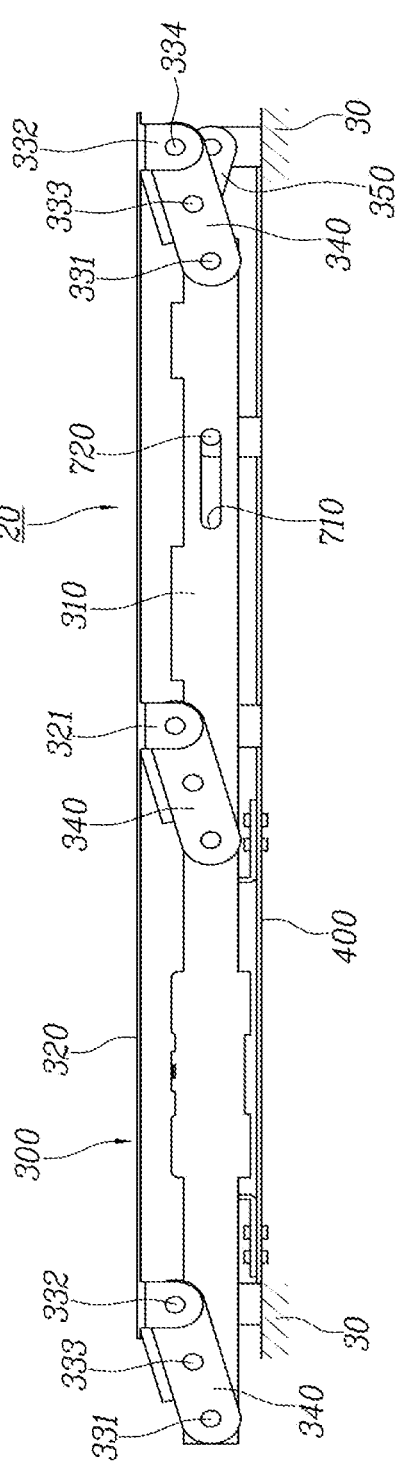
FIG. 3 is a front view of the tilting apparatus of FIG. 2.
Figure 5:
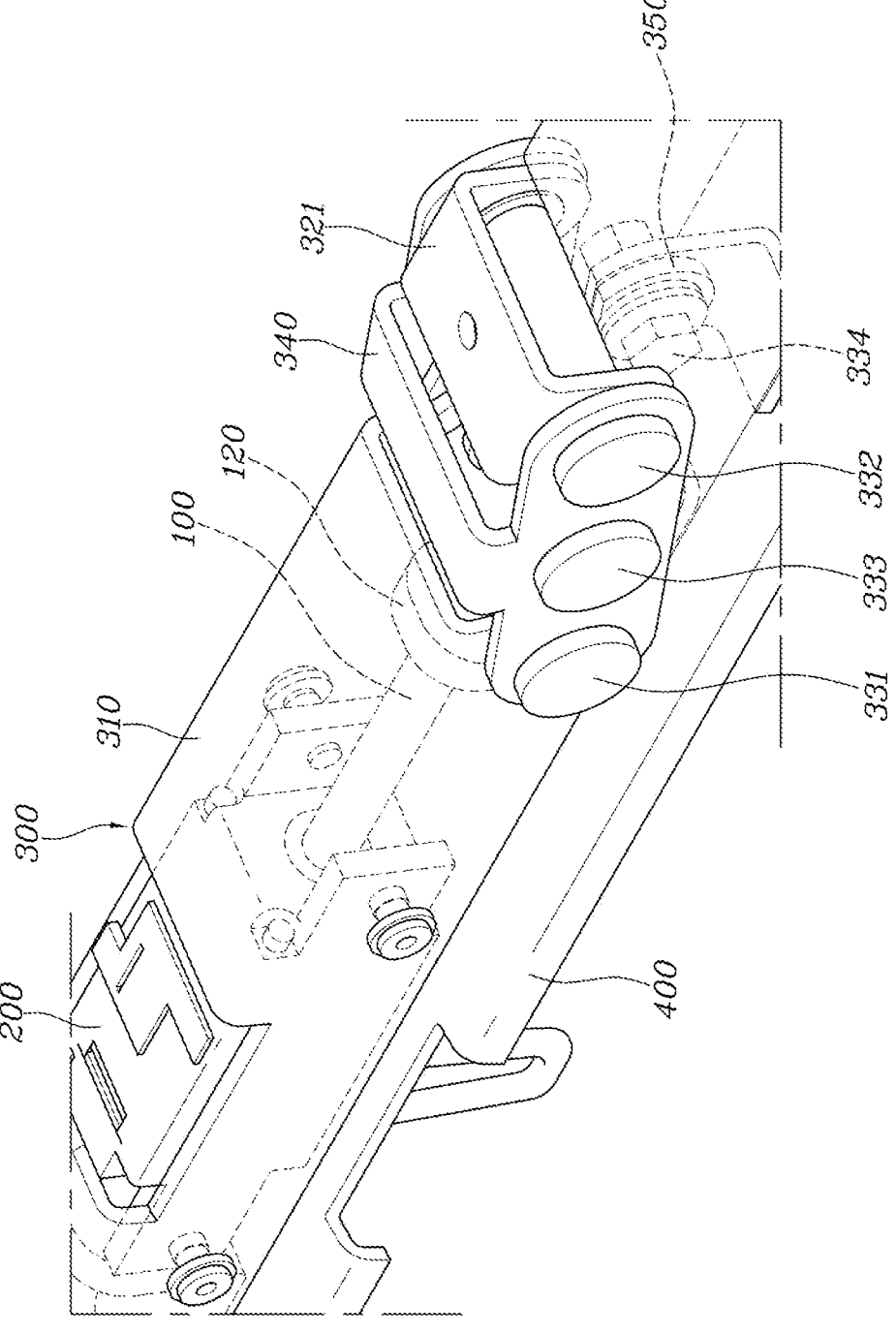
FIG. 5 is an enlarged view showing a portion where a tilting motor is located, in FIG. 4.
Figure 6:
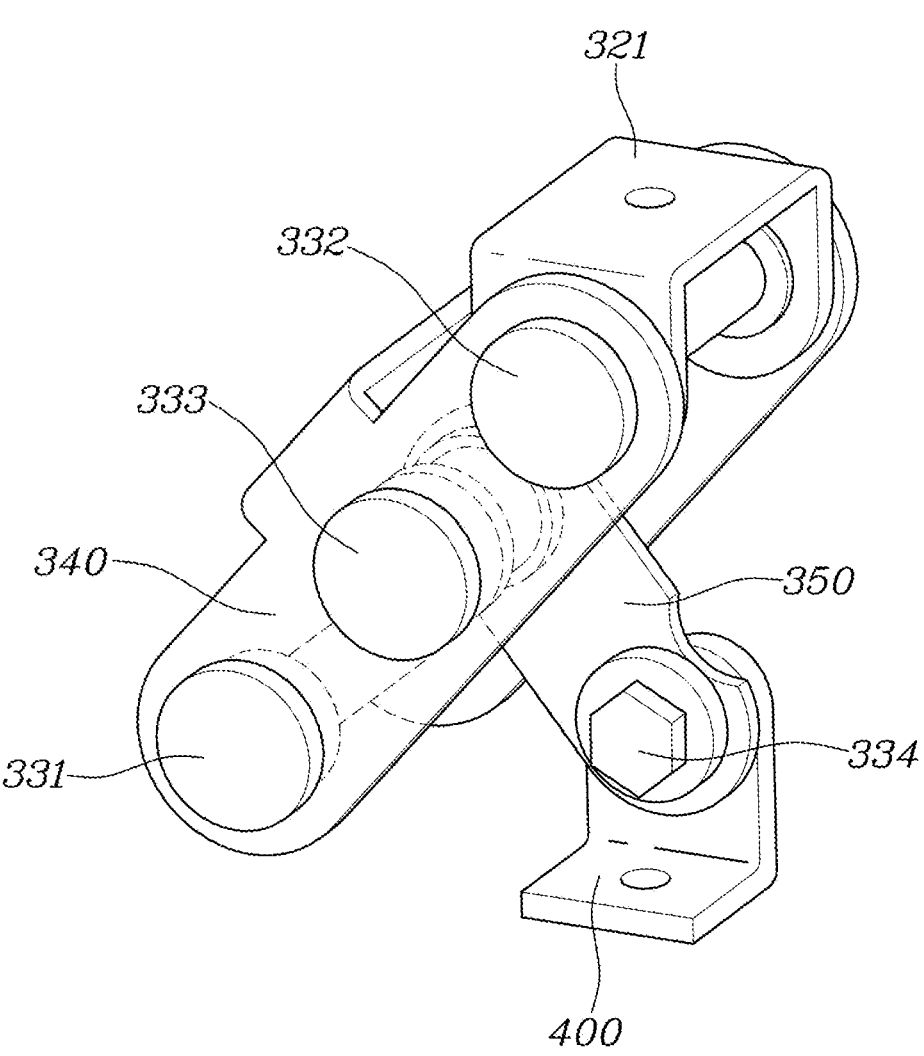
FIG. 6 is a view showing a first rotation link and a second rotation link according to the present disclosure.
Figure 8:
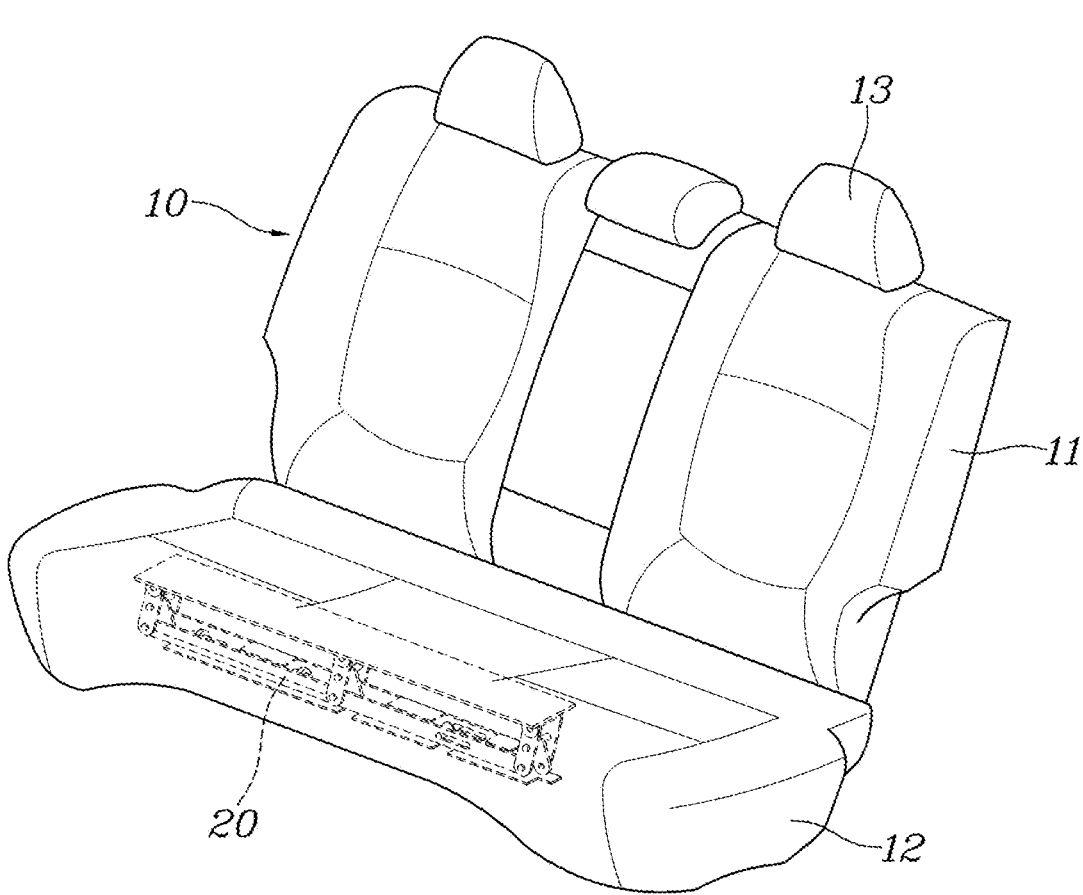
FIG. 8 is a view showing a state in which the front end of the seat cushion is adjusted to a maximum height as the tilting apparatus of FIG. 1 is operated.
Figure 9:
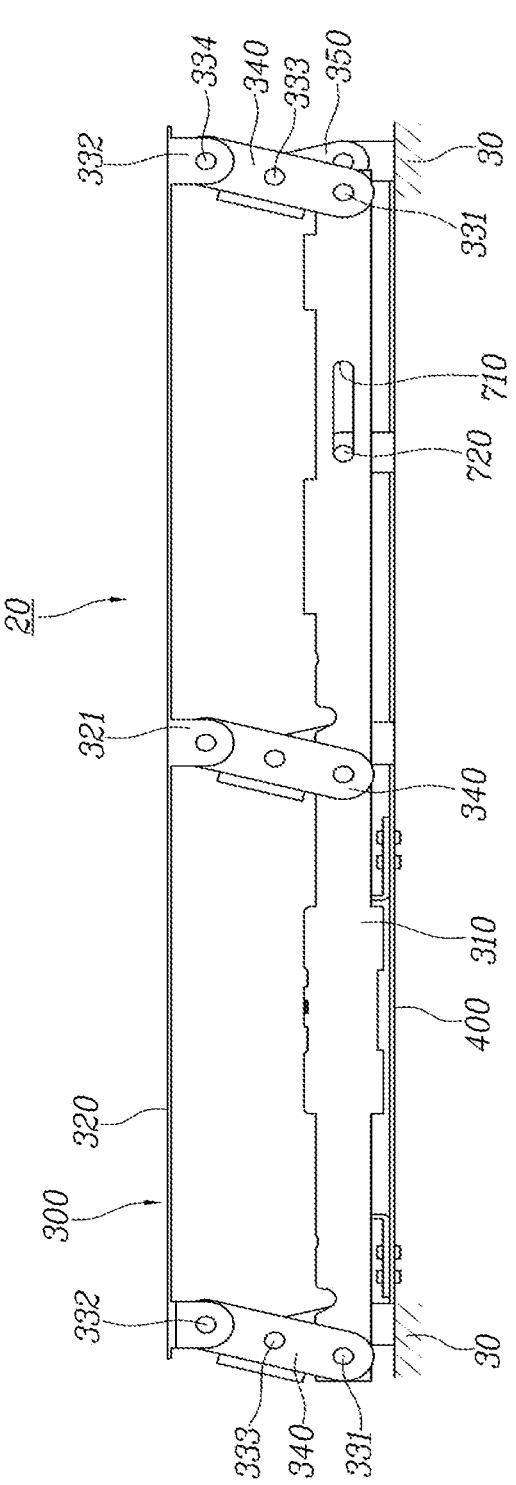
FIG. 9 is a front view showing the tilting apparatus of FIG. 8.
Figure 11:
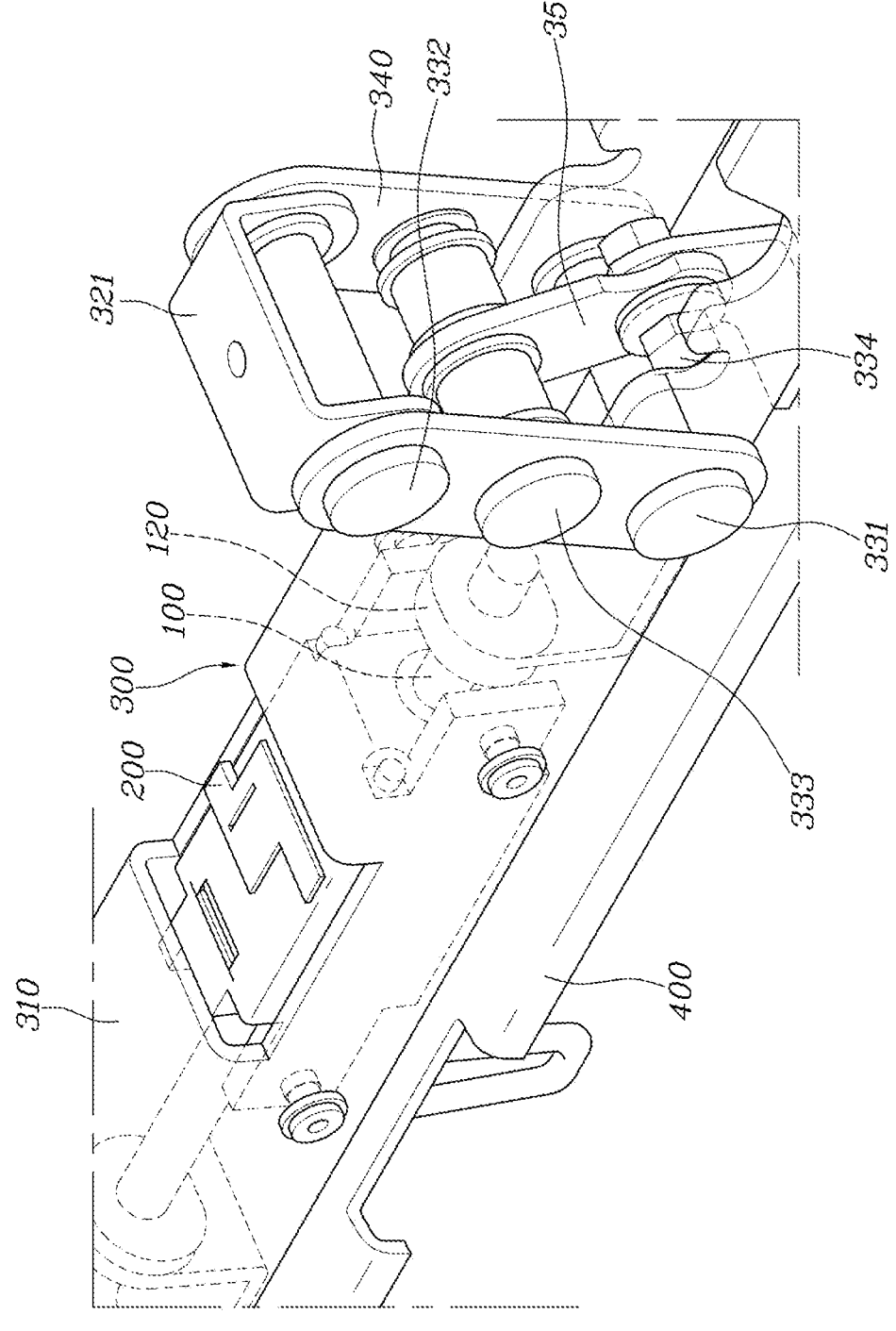
FIG. 11 is an enlarged view showing a portion where the tilting motor is located in FIG. 10.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereafter, an embodiment of the present disclosure will be described in detail with reference to the accompanying drawings and the same or similar components are given the same reference numerals regardless of the numbers of figures and are not repeatedly described.

In the following description, if it is decided that the detailed description of known technologies related to the present disclosure makes the subject matter of the embodiment described herein unclear, the detailed description is omitted.

Furthermore, the accompanying drawings are provided only for easy understanding of the embodiment disclosed in the specification, and the technical spirit disclosed in the specification is not limited by the accompanying drawings, and all changes, equivalents, and replacements should be understood as being included in the spirit and scope of the present disclosure.

Terms including ordinal numbers such as "first", "second", etc. may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween.

On the other hand, it should be understood that when one element is referred to as being "connected directly to" or "coupled directly to" another element, it may be connected to or coupled to another element without the other element intervening therebetween.

Furthermore, a unit or a control unit included in names such as a motor control unit (MCU), a hybrid control unit (HCU), etc. is only a widely used term for a controller that controls a specific function of a vehicle, and does not mean a generic function unit.

The controller may include a communication device communicating with other controllers or a sensor to control the function in charge, a memory storing an operation system or a logic command and input/output information, and at least one process performing determination, calculation, and decision necessary for controlling the function in charge.

Hereinbelow, an apparatus for tilting a seat cushion of a rear seat according to an exemplary embodiment of the present disclosure will be described with reference to accompanying FIGS. 1 to 12.

As shown in FIG. 1, a rear seat 10 of a vehicle includes a seat back 11 supporting the upper body of a passenger, a seat cushion 12 supporting the lower body of the passenger, and a headrest 13 supporting the head of the passenger.

In addition, according to the embodiment of the present disclosure, the seat cushion 12 of the rear seat 10 includes a tilting function so as to further improve ride comfort and convenience of the passenger on the rear seat.

In other words, according to the present disclosure, the seat cushion tilting apparatus 20 of the rear seat includes: a fixing member 100 connected to a vehicle body 30 and extending transversely, and shaft-rotated while a location of the fixing member 100 is fixed; a tilting motor 200 coupled to the fixing member 100, and when being operated, moved transversely in a longitudinal direction of the fixing member 100; and a linkage 300 connecting the tilting motor 200 and the seat cushion 12 of the rear seat 10 to each other and operated to move the front end of the seat cushion 12 vertically when the tilting motor 200 is moved.

As provided herein, the fixing member 100 may be a lead screw or other fastener such as a peg, dowel, rivet, screw, bolt, nail, anchor, or any other attachment mechanism.

Bearings 110 are respectively coupled to opposite ends of the fixing member 100, the bearings 110 are respectively fixed to fixing brackets 120, the fixing brackets 120 are coupled to a base frame 400, and the base frame 400 is fixed to the vehicle body 30.

Therefore, the fixing member 100 has a structure in which the fixing member 100 is connected to the vehicle body 30 via the bearings 110, the fixing brackets 120, and the base frame 400. Specifically, the fixing member 100 has a structure that is shaft-rotatable with respect to the fixing brackets 120 by the bearings 110.

The fixing member 100 serves as a fixed role while being connected to the vehicle body 30. When the tilting motor 200 is operated, the fixing member 100 provides a trajectory on which the tilting motor 200 is moved transversely.

The tilting motor 200 includes the motor and a bracket assembly coupled to the motor. When the tilting motor is operated, the tilting motor 200 is moved transversely along the fixing member 100 to provide power operating the linkage 300.

The tilting motor 200 is disposed to be stacked with the fixing member 100 in the longitudinal direction of the fixing member 100, and the tilting motor 200 is coupled to the fixing member 100 so as to allow power transmission. Accordingly, the fixing member 100 and the tilting motor 200 have a structure in which the fixing member 100 and the tilting motor 200 are disposed in series to minimize the longitudinal size of the tilting apparatus, thereby promoting compactness of the apparatus, which is advantageous.

According to the embodiment of the present disclosure, in order to minimize the longitudinal size of the tilting apparatus, the tilting motor 200 has a mechanism in which the tilting motor is moved transversely along the fixing member 100. Accordingly, as the longitudinal size can be minimized, and slimness of the package can be promoted.

The tilting motor 200 is operated by receiving a signal of a switch 500 that is operated by the passenger sitting on the rear seat, and the switch 500 may be mounted to a portion of a door to facilitate the passenger to operate the switch, or may be installed at the rear seat 10.

The signal of the switch 500 may be transmitted to the tilting motor 200 through the controller 600 or the signal of the switch 500 may be directly transmitted to the tilting motor 200.

When the tilting motor 200 is operated as the passenger operates the switch 500 located inside the vehicle, since the fixing member 100 is in a fixed state, the tilting motor 200 is moved transversely along the fixing member 100, and the linkage 300 is operated by movement of the tilting motor 200 to move the front end of the seat cushion 12 vertically, whereby height adjustment can be achieved.

According to the present disclosure, the linkage 300 includes: a transverse moving body 310 coupled to the tilting motor 200 and moved transversely together with the tilting motor 200; a vertical moving body 320 coupled to the front end of the seat cushion 12; a first rotation link 340 rotatably coupled to the transverse moving body 310 with a first hinge pin 331 as a medium and rotatably coupled to a body bracket 321 of the vertical moving body 320 with a second hinge pin 332 as a medium; and a second rotation link 350 of which a first end is rotatably coupled to the first rotation link 340 with a third hinge pin 333 as a medium between the first hinge pin 331 and the second hinge pin 332 and a second end is rotatably coupled to the base frame 400 with a hinge bolt 334 as a medium.

The linkage 300 is a part that is moved in conjunction with the tilting motor 200 when the tilting motor 200 is moved transversely. The transverse moving body 310 is linearly moved leftward and rightward with the tilting motor 200, the first rotation link 340 and the second rotation link 350 are rotated when the transverse moving body 310 is moved, the vertical moving body 320 is linearly moved when the first rotation link 340 and the second rotation link 350 are rotated to move the entire front end of the seat cushion 12 vertically, whereby height adjustment can be achieved.

The transverse moving body 310 is coupled to both of front and rear surfaces of the tilting motor 200 and extends transversely, so that the tilting motor 200 and the transverse moving body 310 may be coupled to each other by a firm coupling force to be transversely moved in a stable state together.

The vertical moving body 320 is disposed at the front end of the seat cushion 12 to extend transversely. When the vertical moving body 320 is operated, the vertical moving body 320 moves the entire front end of the seat cushion 12 vertically. Accordingly, the front end of the seat cushion 12 constituting the rear seat 10 is vertically moved by operation of the vertical moving body 320, whereby height adjustment is possible.

In addition, height adjustment of the front end of the seat cushion 12 may be performed into various heights between the minimum height and the maximum height of the vertical moving body 320, and in the state in which the height of the vertical moving body 320 is adjusted by restriction force of the tilting motor 200, the front end of the seat cushion 12 may be maintained in a restricted state to prevent movement of the seat cushion.

An assembly of the first rotation link 340 and the second rotation link 350 are configured to be coupled to both of the transverse moving body 310 and the vertical moving body 320 in at least two or more locations. Accordingly, operation of the linkage 300 may be operated in further stable state and the firm coupling force may be maintained.

Preferably, the assembly of the first rotation link 340 and the second rotation link 350 may include three assemblies, and as shown in FIGS. 2-11, one of the three assemblies is assembled to left ends of the transverse moving body 310 and the vertical moving body 320, and one of the three assemblies is assembled to right ends of the transverse moving body 310 and the vertical moving body 320, and a remaining one may be assembled to middle portions between left and right opposite ends.

In order to absorb vertical movement of the front end of the seat cushion 12 when the front end of the seat cushion 12 constituting the rear seat 10 is adjusted in height while being vertically moved with operation of the tilting apparatus 20 according to the present disclosure, the tilting apparatus includes a hinge member 800 having a rotating structure, and the hinge member 800 connects a rear end of the seat cushion 12 and the vehicle body 30 to each other.

Figure 12:
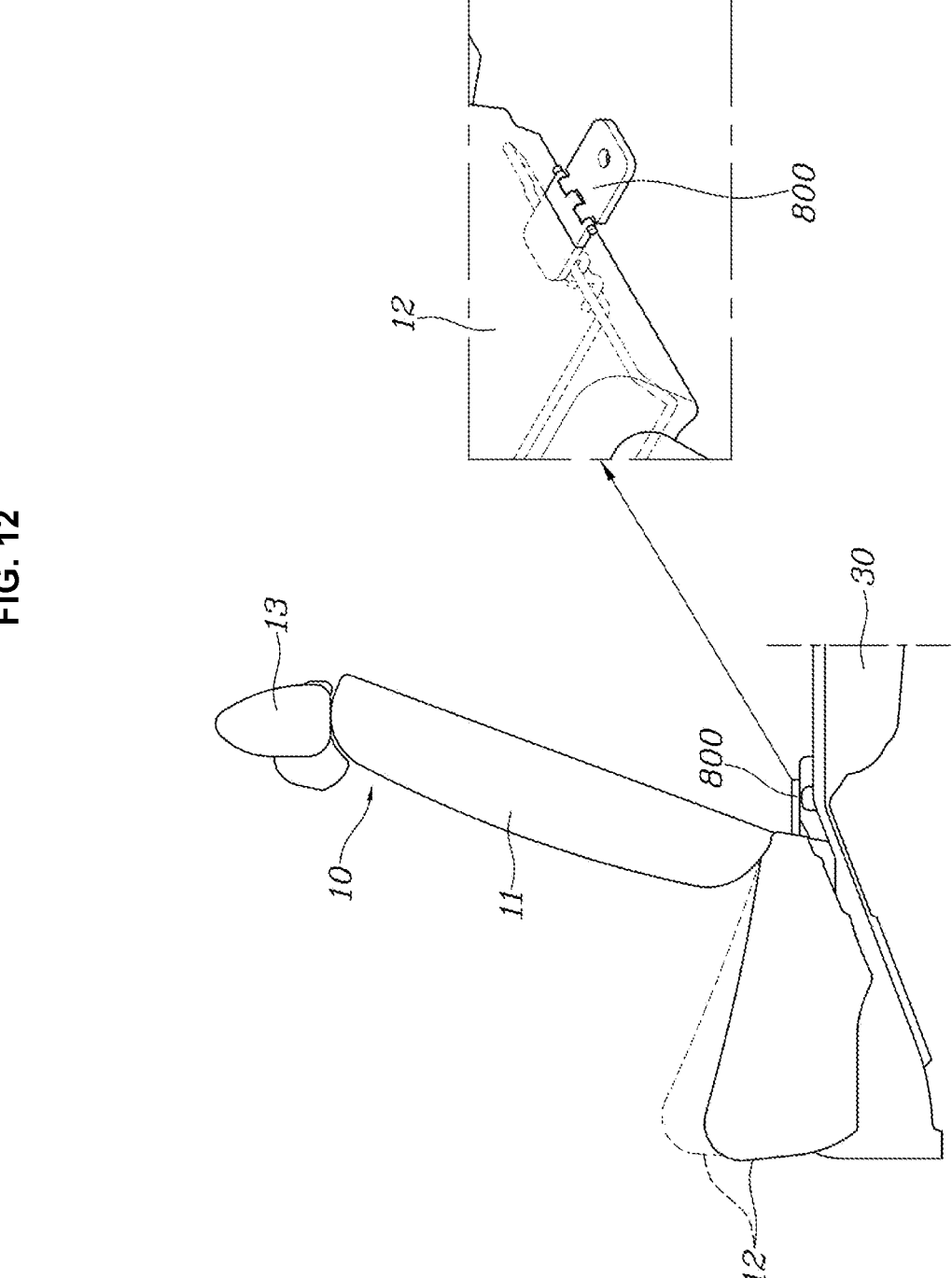
FIG. 12 is a side view showing the front end of the seat cushion tilted to the minimum height and the maximum height according to the present disclosure, and a call-out showing a hinge member of the present disclosure.

In FIG. 12, the seat cushion 12 shown with a closed line is in a state in which the height is adjusted to the lowest end (minimum height), and the seat cushion 12 shown with a dotted line is in a state in which the height is adjusted to the highest end (maximum height).

As described above, when the front end of the seat cushion 12 is adjusted in height while being vertically moved with operation of the tilting apparatus 20, and the rear end of the seat cushion 12 is fixed to the vehicle body 30 to prevent movement of the seat cushion 12, a weight is concentrated to a mounting portion of the rear end of the seat cushion 12 to cause breakage of parts.

In order to prevent the breakage of parts, the embodiment according to the present disclosure is configured to provide the rotating structure by applying the hinge member 800 to the rear end of the seat cushion 12. Accordingly, the embodiment according to the present disclosure is configured to absorb the vertical movement when the height of the front end of the seat cushion 12 is adjusted, so that prevention of breakage of parts and efficient tilting operation can be promoted.

Furthermore, the embodiment according to the present disclosure includes the controller 600 controlling operation of the tilting motor 200, and the controller 600 controls operation of the tilting motor 200 by using a signal of a collision sensor 900.

Therefore, the controller 600 controls operation of the tilting motor 200 such that the front end of the seat cushion 12 is adjusted to the maximum height simultaneously with occurrence of a collision or immediately before occurrence of a collision, so that the safety of the passenger in an accident can be enhanced as much as possible.

When a collision occurs, and the front end of the seat cushion 12 of the rear seat 10 is adjusted upward with operation of the tilting apparatus 20, movement of the passenger in an accident can be restricted as much as possible, whereby additional injuries due to the accident can be minimized and the safety of the passenger can be significantly strengthened.

As described above, the embodiment according to the present disclosure is the apparatus for tilting the seat cushion of the rear seat, the apparatus implementing the tilting function by moving the front end of the seat cushion 12 constituting the rear seat 10 vertically. Therefore, there is an advantage in that ride comfort and convenience of the passenger in the rear seat can be improved whereby marketability can be improved.

Furthermore, the present disclosure is configured to operate the tilting apparatus 20 simultaneously with occurrence of a collision or immediately before occurrence of a collision so as to adjust the front end of the seat cushion 12 upward as much as possible, so that movement of the passenger in an accident can be restricted as much as possible. Therefore, there is an advantage in that minimization of occurrence of additional injuries and the safety of the passenger can be promoted.

Although the present disclosure was provided above in relation to specific embodiments shown in the drawings, it is apparent to those skilled in the art that the present disclosure may be changed and modified in various ways without departing from the scope of the present disclosure, which is provided in the following claims.

What is claimed is:

1. An apparatus for tilting a seat cushion of a rear seat of a vehicle, the apparatus comprising:
  a fixing member connected to a vehicle body and configured to be shaft-rotated while the fixing member is supported by the vehicle body, wherein the fixing member is a lead screw;
  a tilting motor coupled to the fixing member; and
  a linkage configured to connect the tilting motor and the seat cushion of the rear seat, and operable to move a front end of the seat cushion vertically when the tilting motor is moved;
  wherein the tilting motor is configured to move transversely in a longitudinal direction of the fixing motor.

2. The apparatus of claim 1, wherein the fixing member extends transversely.

3. The apparatus of claim 1, wherein:
  opposite ends of the fixing member are respectively coupled to fixing brackets with bearings as a medium; and
  the fixing brackets are coupled to a base frame fixed to the vehicle body.

4. The apparatus of claim 1, wherein the tilting motor is disposed to be stacked with the fixing member in the longitudinal direction of the fixing member and is coupled to the fixing member so as to allow power transmission.

5. The apparatus of claim 1, wherein the tilting motor is configured to be operated by receiving a signal of a switch operated by a passenger.

6. The apparatus of claim 1, wherein the linkage comprises:
  a transverse moving body coupled to the tilting motor to be moved leftward and rightward together with the tilting motor;
  a vertical moving body coupled to the front end of the seat cushion;
  a first rotation link rotatably coupled to the transverse moving body with a first hinge pin as a medium and rotatably coupled to a body bracket of the vertical moving body with a second hinge pin as a medium; and
  a second rotation link of which a first end is rotatably coupled to the first rotation link with a third hinge pin as a medium between the first hinge pin and the second hinge pin and a second end is rotatably hinged to the base frame.

7. The apparatus of claim 6, wherein the transverse moving body is coupled to front and rear surfaces of the tilting motor and extends transversely.

8. The apparatus of claim 6, wherein the transverse moving body has a guide slot formed by extending in a moving direction of the transverse moving body; and a guide pin fixed to the base frame is inserted into the guide slot, and the guide slot and the guide pin guide movement of the transverse moving body.

9. The apparatus of claim 6, wherein the vertical moving body is disposed to extend transversely in the front end of the seat cushion, and when being operated, moves the front end of the seat cushion vertically.

10. The apparatus of claim 6, wherein height adjustment of the front end of the seat cushion is possible within various locations between minimum height and maximum height of the vertical moving body.

11. The apparatus of claim 6, wherein an assembly of the first rotation link and the second rotation link is coupled to both of the transverse moving body and the vertical moving body, in at least two or more locations.

12. The apparatus of claim 1, further comprising:

a hinge member having a rotation structure, the hinge member connecting a rear end of the seat cushion and the vehicle body to each other so as to absorb vertical movement of the front end of the seat cushion.

13. The apparatus of claim 1, further comprising:

a controller configured to control an operation of the tilting motor, wherein the controller is configured to use a signal of a collision sensor to control an operation of the tilting motor so as to adjust the front end of the seat cushion to the maximum height simultaneously with occurrence of a collision or immediately before occurrence of a collision.

14. A vehicle comprising:

an apparatus for tilting a seat cushion of a seat, the apparatus comprising:

a fixing member connected to a vehicle body and configured to be shaft-rotated while the fixing member is supported by the vehicle body, wherein the fixing member is a lead screw;

a tilting motor coupled to the fixing member; and a linkage configured to connect the tilting motor and the seat cushion of the seat, and operable to move a front end of the seat cushion vertically when the tilting motor is moved;

wherein the tilting motor is configured to move transversely in a longitudinal direction of the fixing motor.

15. The vehicle of claim 14, wherein the seat is a rear seat.

16. An apparatus for tilting a seat cushion of a rear seat of a vehicle, the apparatus comprising:

a fixing member connected to a vehicle body and configured to be shaft-rotated while the fixing member is supported by the vehicle body;

a tilting motor coupled to the fixing member; and a linkage configured to connect the tilting motor and the seat cushion of the rear seat, and operable to move a front end of the seat cushion vertically when the tilting motor is moved, wherein the linkage comprises:

a transverse moving body coupled to the tilting motor to be moved leftward and rightward together with the tilting motor;

a vertical moving body coupled to the front end of the seat cushion;

a first rotation link rotatably coupled to the transverse moving body with a first hinge pin as a medium and rotatably coupled to a body bracket of the vertical moving body with a second hinge pin as a medium; and a second rotation link of which a first end is rotatably coupled to the first rotation link with a third hinge pin as a medium between the first hinge pin and the second hinge pin and a second end is rotatably hinged to the base frame.

17. An apparatus for tilting a seat cushion of a rear seat of a vehicle, the apparatus comprising:

a drive unit configured to provide a driving force;

a horizontally-moving member coupled to the drive unit and configured to perform a linear movement along a substantially horizontal path in response to the driving force of the drive unit; and a link mechanism coupling the horizontally-moving member to a front end of the seat cushion, the link mechanism configured to convert the linear movement of the horizontally-moving member into a vertical movement of the front end of the seat cushion.

* * * * *